United States Patent
Zachrisson et al.

(10) Patent No.: US 11,681,371 B2
(45) Date of Patent: Jun. 20, 2023

(54) EYE TRACKING SYSTEM

(71) Applicant: TOBII AB, Danderyd (SE)

(72) Inventors: Joakim Zachrisson, Danderyd (SE); Simon Johansson, Danderyd (SE); Mikael Rosell, Danderyd (SE); Daniel Wrang, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 17/810,179

(22) Filed: Jun. 30, 2022

(65) Prior Publication Data

US 2023/0004223 A1 Jan. 5, 2023

(30) Foreign Application Priority Data

Jun. 30, 2021 (SE) .................................. 2150849-4

(51) Int. Cl.
| | |
|---|---|
| *G06F 3/01* | (2006.01) |
| *G06T 7/90* | (2017.01) |
| *G06V 40/18* | (2022.01) |
| *H04N 25/13* | (2023.01) |

(52) U.S. Cl.
CPC .............. *G06F 3/015* (2013.01); *G06T 7/90* (2017.01); *G06V 40/197* (2022.01); *H04N 25/135* (2023.01)

(58) Field of Classification Search
CPC .................................. G06F 3/015; G06T 7/30
USPC ....................................................... 345/156
See application file for complete search history.

(56) References Cited

U.S. PATENT DOCUMENTS

| | | | |
|---|---|---|---|
| 10,559,307 B1* | 2/2020 | Khaleghi | ................ G10L 15/26 |
| 2008/0212850 A1 | 9/2008 | Adachi et al. | |
| 2010/0033333 A1 | 2/2010 | Victor et al. | |
| 2014/0098198 A1* | 4/2014 | Lee | .......... G06F 3/013 348/48 |
| 2016/0012291 A1* | 1/2016 | Cleland | ................ A61B 3/1233 382/117 |
| 2018/0032135 A1 | 2/2018 | Rijnders | |

(Continued)

FOREIGN PATENT DOCUMENTS

| | | |
|---|---|---|
| CN | 111868737 A | 10/2020 |
| EP | 3835925 A1 | 6/2021 |

(Continued)

OTHER PUBLICATIONS

Swedish search report completed Feb. 18, 2022 regarding patent application SE 2150849-4.

(Continued)

*Primary Examiner* — Calvin C Ma
(74) *Attorney, Agent, or Firm* — Christopher I. Moylan (57) ABSTRACT

An eye tracking system comprising a controller configured to receive a reference image of an eye of a user and a current image of the eye of the user. The controller is also configured to determine a difference between the reference image and the current image to define a differential image. The differential image has a two dimensional pixel array of pixel locations that are arranged in a plurality of rows and columns. Each pixel location has a differential intensity value. The controller is further configured to calculate a plurality of row values by combining the differential intensity values in corresponding rows of the differential image and to determine eyelid data based on the plurality of row values.

19 Claims, 7 Drawing Sheets

(56) References Cited

U.S. PATENT DOCUMENTS

2019/0318154 A1* 10/2019 Guo .................... G06V 10/431
2020/0065579 A1    2/2020 Huang et al.

FOREIGN PATENT DOCUMENTS

| WO | 2005059736 A1 | 6/2005 |
| WO | 2010073879 A1 | 7/2010 |
| WO | 2020044180 A2 | 3/2020 |

OTHER PUBLICATIONS

Extended European search report completed Nov. 16, 2022 regarding patent application EP 22 18 0475.

* cited by examiner

EYE TRACKING SYSTEM

CROSS-REFERENCES TO RELATED APPLICATIONS

This application claims priority to Swedish Application No. 2150849-4, entitled "AN EYE TRACKING SYSTEM," filed on Jun. 30, 2021. The entire disclosure of the above-referenced application is incorporated herein by this reference.

FIELD

The present disclosure generally relates to the field of eye tracking. In particular, the present disclosure relates to eye tracking systems and methods for determining eyelid data that can represent movement of an eyelid (such as a blink) or the location of the eyelid in an image.

BACKGROUND

In eye tracking applications, digital images are retrieved of the eyes of a user and the digital images are analyzed in order to estimate the gaze direction of the user. The estimation of the gaze direction may be based on computer based image analysis of features of the imaged eye. One known example method of eye tracking includes the use of infrared light and an image sensor. The infrared light is directed towards the pupil of a user and the reflection of the light is captured by an image sensor.

Many eye tracking systems estimate gaze direction based on identification of a pupil position together with glints or corneal reflections. Therefore, accuracy in the estimation of gaze direction may depend upon an accuracy of the identification or detection of the pupil position and/or the corneal reflections. One or more spurious image features such as stray reflections may be present in the digital images which can detrimentally affect eye feature identification. For example, spurious image features can result in incorrect glint to illuminator matching and/or an incorrect pupil position, resulting in an erroneous gaze determination. It can be difficult to determine when such errors have occurred and eye tracking systems can get stuck in an erroneous tracking sequence.

Portable or wearable eye tracking devices have also been previously described. One such eye tracking system is described in U.S. Pat. No. 9,041,787 (which is hereby incorporated by reference in its entirety). A wearable eye tracking device is described using illuminators and image sensors for determining gaze direction.

SUMMARY

According to a first aspect of the present disclosure there is provided an eye tracking system comprising a controller configured to: receive a reference image of an eye of a user; receive a current image of the eye of the user; determine a difference between the reference image and the current image to define a differential image, wherein the differential image has a two dimensional pixel array of pixel locations that are arranged in a plurality of rows and columns, each pixel location having a differential intensity value; calculate a plurality of row values by combining the differential intensity values in corresponding rows of the differential image; and determine eyelid data based on the plurality of row values. In this way, eyelid data can be determined in a computationally efficient way.

The reference image and the current image may comprise a pixel array of pixel locations, each pixel location having an intensity value. The controller may be configured to determine the difference between the reference image and the current image by matrix subtraction of the corresponding pixel arrays to define the differential image as the pixel array of differential intensity values.

The controller may be configured to: down-sample the received reference image and the received current image to provide a down-sampled reference image and a down-sampled current image respectively; and determine the difference between the down-sampled reference image and the down-sampled current image to define the differential image.

The controller may be configured to perform a coordinate transformation of the received reference image and the received current image to provide a reoriented reference image and a reoriented current image respectively, such that the eyelid movements are vertical in the reoriented images; and determine the difference between the reoriented reference image and the reoriented current image to define the differential image.

The controller may be configured to: perform one or more image enhancement operations on the differential image to provide an enhanced differential image; and calculate the plurality of row values by combining the differential intensity values in corresponding rows of the enhanced differential image.

The controller may be configured to: calculate the plurality of row values by summing the differential intensity values in the corresponding rows of the differential image.

The eyelid data may comprise eyelid location data that represents a location of an edge of an eyelid in the current image. The controller may be configured to: determine the eyelid location data as a row identifier associated with the row value that has the highest value, if that highest value is greater than an eyelid detection threshold.

The eyelid data may comprise eyelid location data that represents a location of an edge of an eyelid in the current image. The controller may be configured to: identify the row value that has the highest value; determine an eyelid detection region of the differential image that comprises an above-eyelid detection region of the differential image as a predetermined number of rows that are above the row that has the highest row value, a below-eyelid detection region of the differential image as a predetermined number of rows that are below the row that has the highest row value, and the row that has the highest row value; for each of the plurality of columns in the eyelid detection region, determine an eyelid edge coordinate as a combination of the row identifier for the pixel in the eyelid detection region that has the highest differential intensity value and a column identifier for the associated column; and provide the eyelid location data as the plurality of eyelid edge coordinates.

The eyelid data may comprise blink data that can have either a blinking value or a not-blinking value to provide an indication of whether or not the eye of the user is blinking in the current image. The controller may comprise a blink detector that is configured to: set the blink data as the blinking value if the highest row value is greater than an eyelid detection threshold.

The eyelid data may further comprise eyelid location data that represents a location of an edge of an eyelid in the current image. The blink detector may be further configured to: receive pupil location data representative of the location of the pupil in the current image; determine a pupil-eyelid distance as the vertical distance between the pupil location data and the eyelid location data; and set the blink data as the blinking value if: the highest row value is greater than an eyelid detection threshold; and the pupil-eyelid distance is less than an eye closing threshold.

The blink detector may be further configured to: receive pupil movement data representative of movement of the pupil between images up to the current image; and set the blink data as the blinking value if the highest row value is greater than an eyelid detection threshold and the pupil movement data does not represent downward movement.

If the blink data has the blinking value, the blink detector may be further configured to: sequentially receive subsequent images; for one or more of the subsequent images: determine a difference between a subsequent reference image and the subsequent image to define a subsequent differential image, wherein the subsequent differential image has a two dimensional pixel array of pixel locations that are arranged in a plurality of rows and columns, each pixel location having a subsequent differential intensity value; set the blink data as the non-blinking value when at least a predetermined number of subsequent images have been received after the current image for which the blink data was set as the blinking value; calculate a plurality of row values by combining the subsequent differential intensity values in corresponding rows of the subsequent differential image; determine a subsequent maximum row value as the highest value of the plurality of row values; compare the subsequent maximum row value for the most recently received subsequent image with an eye opening threshold; in response to the subsequent maximum row value for the most recently received subsequent current image being greater than the eye opening threshold: (a) store the subsequent maximum row value for the most recently received subsequent current image as a peak value, (b) start a count of subsequently received frames from an initial value, (c) if the subsequent maximum row value of a later subsequent image is greater than the peak value, then return to step (a), and (d) if the count reaches an eyelid-open value without the subsequent maximum row value of a later subsequent image exceeding the peak value, then set the blink data as the not-blinking value.

The controller may be configured to calculate the plurality of row values by: combining the differential intensity values in all of the columns of the corresponding rows of the differential image; calculating the plurality of row values by combining the differential intensity values in a subset of the columns of the corresponding rows of the differential image; calculating the plurality of row values by combining the differential intensity values in corresponding individual rows of the differential image; or calculating the plurality of row values by combining the differential intensity values in corresponding sets of adjacent rows of the differential image.

There is also provided a head mounted device comprising any eye tracking system disclosed herein.

According to a further aspect of the disclosure, there is provided a method of providing eyelid data, the method comprising: receiving a reference image of an eye of a user; receiving a current image of the eye of the user; determining a difference between the reference image and the current image to define a differential image, wherein the differential image has a two dimensional pixel array of pixel locations that are arranged in a plurality of rows and columns, each pixel location having a differential intensity value; calculating a plurality of row values by combining the differential intensity values in corresponding rows of the differential image; and determining eyelid data based on the plurality of row values.

According to a further aspect of the disclosure, there is provided one or more non-transitory computer-readable storage media storing computer-executable instructions that, when executed by a computing system, causes the computing system to perform any method disclosed herein.

There is also disclosed an eye tracking system comprising a blink detector configured to: receive left-blink data that represents whether or not the left eye of a user is blinking; receive right-blink data that represents whether or not the right eye of the user is blinking; and apply a logical AND operation to the left-blink data and the right-blink data in order to provide combined-blink data that only represents a blink when both the left-blink data and the right-blink data indicate that both eyes of the user are blinking.

There is also disclosed a method of operating an eye tracking system, the method comprising: receiving left-blink data that represents whether or not the left eye of a user is blinking; receiving right-blink data that represents whether or not the right eye of the user is blinking; and applying a logical AND operation to the left-blink data and the right-blink data in order to provide combined-blink data that only represents a blink when both the left-blink data and the right-blink data indicate that both eyes of the user are blinking.

BRIEF DESCRIPTION OF THE DRAWINGS

One or more embodiments will now be described by way of example only with reference to the accompanying drawings in which.

DETAILED DESCRIPTION

Figure 1:
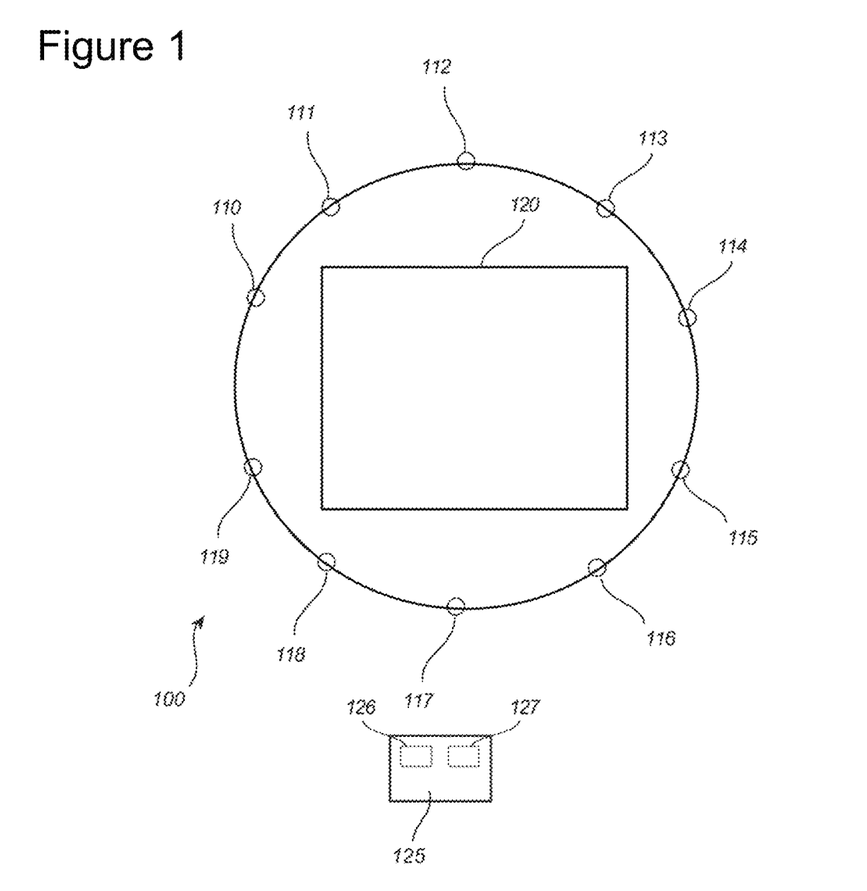
FIG. 1 shows a schematic view of an eye tracking system which may be used to capture a sequence of images that can be used by example embodiments.

FIG. 1 shows a simplified view of an eye tracking system 100 (which may also be referred to as a gaze tracking system) in a head mounted device in the form of a virtual or augmented reality (VR or AR) device or VR or AR glasses or anything related, such as extended reality (XR) or mixed reality (MR) headsets. The system 100 comprises an image sensor 120 (e.g. a camera) for capturing images of the eyes of the user. The system may optionally include one or more illuminators 110-119 for illuminating the eyes of a user, which may for example be light emitting diodes emitting light in the infrared frequency band, or in the near infrared frequency band and which may be physically arranged in a variety of configurations. The image sensor 120 may for example be an image sensor of any type, such as a complementary metal oxide semiconductor (CMOS) image sensor or a charged coupled device (CCD) image sensor. The image sensor may consist of an integrated circuit containing an array of pixel sensors, each pixel containing a photodetector and an active amplifier. The image sensor may be capable of converting light into digital signals. In one or more examples, it could be an Infrared image sensor or IR image sensor, an RGB sensor, an RGBW sensor or an RGB or RGBW sensor with IR filter.

The eye tracking system 100 may comprise circuitry or one or more controllers 125, for example including a receiver 126 and processing circuitry 127, for receiving and processing the images captured by the image sensor 120. The circuitry 125 may for example be connected to the image sensor 120 and the optional one or more illuminators 110-119 via a wired or a wireless connection and be co-located with the image sensor 120 and the one or more illuminators 110-119 or located at a distance, e.g. in a different device. In another example, the circuitry 125 may be provided in one or more stacked layers below the light sensitive surface of the light sensor 120.

The eye tracking system 100 may include a display (not shown) for presenting information and/or visual stimuli to the user. The display may comprise a VR display which presents imagery and substantially blocks the user's view of the real world or an AR display which presents imagery that is to be perceived as overlaid over the user's view of the real world.

The location of the image sensor 120 for one eye in such a system 100 is generally away from the line of sight for the user in order not to obscure the display for that eye. This configuration may be, for example, enabled by means of so-called hot mirrors which reflect a portion of the light and allows the rest of the light to pass, e.g. infrared light is reflected, and visible light is allowed to pass.

While in the above example the images of the user's eye are captured by a head mounted image sensor 120, in other examples the images may be captured by an image sensor that is not head mounted. Such a non-head mounted system may be referred to as a remote system.

In an eye tracking system, a gaze signal can be computed per each eye of the user (left and right). The quality of these gaze signals can be reduced by disturbances in the input images (such as image noise) and by incorrect algorithm behavior (such as incorrect predictions). A goal of the eye tracking system is to deliver a gaze signal that is as good as possible, both in terms of accuracy (bias error) and precision (variance error). For many applications it can be sufficient to deliver only one gaze signal per time instance, rather than both the gaze of the left and right eyes individually. Further, the combined gaze signal can be provided in combination with the left and right signals. Such a gaze signal can be referred to as a combined gaze signal.

Figure 2:
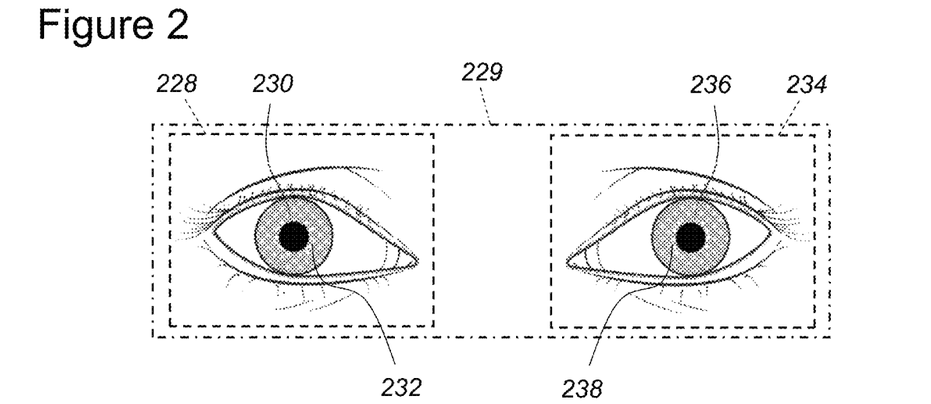
FIG. 2 shows an example image of a pair of eyes.

FIG. 2 shows a simplified example of an image 229 of a pair of eyes, captured by an eye tracking system such as the system of FIG. 1. The image 229 can be considered as including a right eye image 228, of a person's right eye, and a left eye image 234, of the person's left eye. In this example the right eye image 228 and the left eye image 234 are both parts of a larger image of both of the person's eyes. In other examples, separate image sensors may be used to acquire the right eye image 228 and the left eye image 234.

The system may employ image processing (such as digital image processing) for extracting features in the image. The system may for example identify the location of the pupil 230, 236 in the one or more images captured by the image sensor. The system may determine the location of the pupil 230, 236 using a pupil detection process. The system may also identify corneal reflections 232, 238 located in close proximity to the pupil 230, 236. The system may estimate a corneal center or eye ball center based on the corneal reflections 232, 238. For example, the system may match each of the individual corneal reflections 232, 238 for each eye with a corresponding illuminator and determine the corneal center of each eye based on the matching. The system can then determine a gaze ray (which may also be referred to as a gaze vector) for each eye including a position vector and a direction vector. The gaze ray may be based on a gaze origin and gaze direction which can be determined from the respective glint to illuminator matching/corneal centers and the determined pupil position. The gaze direction and gaze origin may themselves be separate vectors. The gaze rays for each eye may be combined to provide a combined gaze ray.

As mentioned above, any errors in glint to illuminator matching (which may simply be referred to as glint matching) or pupil position determination can result in an incorrect gaze determination. The results of glint matching and pupil detection can be considered as binary. For glint matching, either the glint matching is correct and a cornea position is determined that is good enough for accurate gaze computation, or it is incorrect which results in a cornea position that cannot be used to accurately map gaze. Similarly, for pupil detection, either the detected pupil is close enough for circle fitting to accurately identify a pupil, or it is incorrect such that the correct pupil cannot be identified and cannot be used to accurately map gaze. However, errors in determining these intermediate parameters can be difficult to detect. As a result, some systems can get stuck in an incorrect tracking regime and provide an insufficient gaze determination. This can be particularly detrimental for many eye tracking applications.

In particular, gaze estimation is often very unstable during blinking and squinting. This causes significant problems for foveated rendering, in which an image quality is reduced in the user's peripheral vision as determined by their calculated gaze. In the use case of foveated rendering, unstable gaze estimation will cause the foveation area to jump, causing noticeable graphic artifacts and a bad user experience. This can be mitigated using a blink detector to lock the foveation area during a blink.

Blink detection can also be used within the application of social interactions in VR since it allows for a more complete visualization of the eyes of a virtual avatar.

Figure 3:
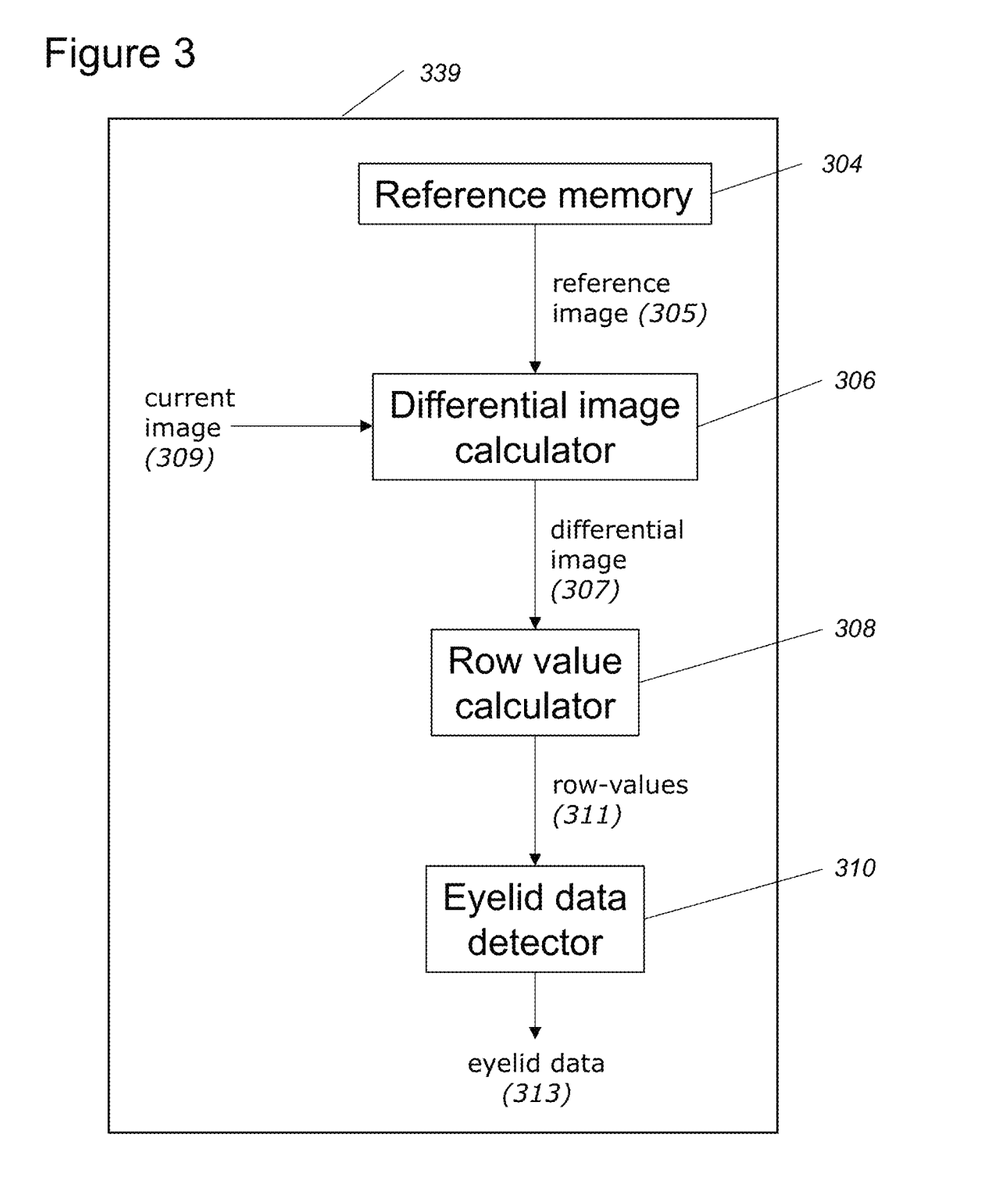
FIG. 3 shows an example of an eye tracking system according to an embodiment of the present disclosure.

FIG. 3 shows an example of an eye tracking system 339 according to an embodiment of the present disclosure. The functionality that is illustrated in FIG. 3 may be provided by one or more controllers. The eye tracking system may be part of, or associated with, a head mounted device or a remote system. The eye tracking system 339 provides eyelid data 313 that is representative of a characteristic of a user's eyelid. As will be discussed in detail below, the eyelid data 313 can be eyelid movement data (e.g. representative of a blink) or eyelid location data that identifies the location of the eyelid in an image. In some examples, the eyelid location data can be one or more row identifiers or a set of coordinates. The functionality of FIG. 3 advantageously enables eyelid data 313 to be determined in a computationally efficient way.

The eye tracking system 339 in this example includes an optional reference memory 304, which provides a reference image 305 of an eye of a user to a differential image calculator 306. The differential image calculator 306 also receives a current image 309 of the eye of the user. The current image 309 is the image of the eye of the user for which the eyelid data 313 will be calculated. The reference image 305 is an image from the same eye of the same user at an earlier instant in time (that is, an earlier image in a stream of images/frames of the user's eye). In some examples the reference image 305 may be the immediately preceding image in the stream, and in other examples it may not be the immediately preceding image in the stream. It will be appreciated from the description that follows that there can be advantages to there being a relatively short period between the times that the reference image 305 and the current image 309 were recorded because the eyelid data 313 will be determined based upon a difference between these images.

The images of an eye of a user, including the reference image 305 and the sample image 309, may comprise digital images produced by an image sensor. The image may equivalently be referred to as an image frame or frame. The image may comprise a pixel array, which includes a plurality of pixel locations and an intensity value at each of the pixel locations. The pixel arrays comprise two dimensional arrays of pixel locations that are arranged in a plurality of rows and columns. The rows and columns are mutually orthogonal. In the following examples, the rows will be described as horizontal lines of pixels in the images and the columns will be described as vertical lines of pixels. However, it will be appreciated that the rows and columns do not have to be horizontally and vertically aligned in the image, especially if the user's eye is not presented horizontally in the image. In some examples, if the user's eye is not presented horizontally in the images, then the eye tracking system 339 can perform some preprocessing on the images to rotate the images such that the horizontal aspect of the user's eye is aligned with the horizontal aspect of the image before it is passed to the differential image calculator 306 for processing.

Furthermore, in some examples the eye tracking system 339 can use images in which the horizontal aspect of the user's eye is aligned with a vertical aspect of the image. In which case, the lines of pixels that extend in a vertical direction in the image can be considered as the rows of the image because they align with the horizontal aspect of the user's eye.

The differential image calculator 306 determines a difference between the reference image 305 and the current image 309 to define a differential image 307. For example, the differential image calculator 306 can perform a matrix subtraction between the pixel arrays of the reference image 305 and the current image 309. In other words, the differential image calculator 306 determines the difference between intensity values at corresponding pixel locations in the reference image and the current image. The resultant differential image 307 has a two dimensional pixel array of pixel locations that are arranged in a plurality of rows and columns, each pixel location having a differential intensity value.

Figure 4:
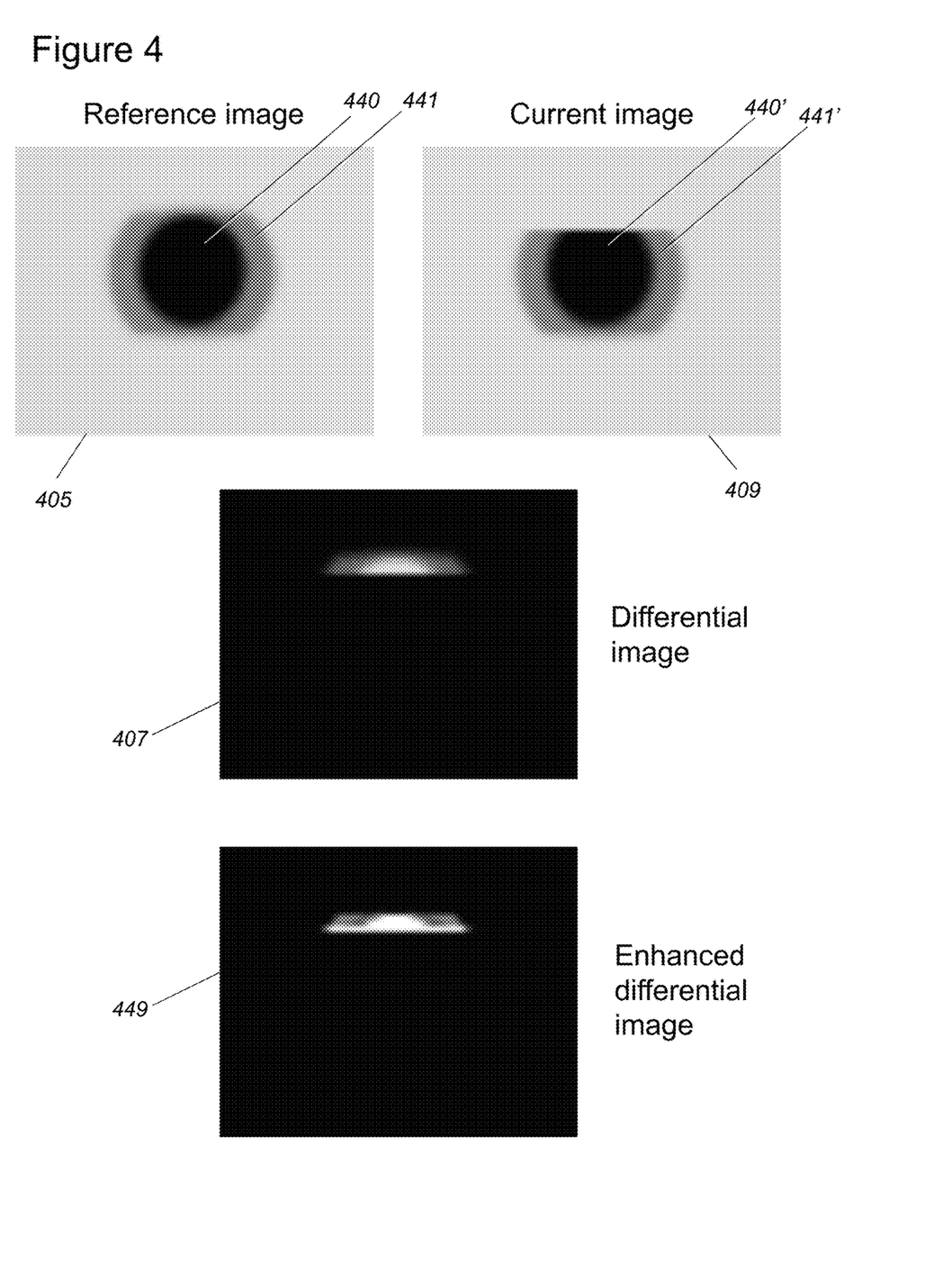
FIG. 4 shows example images that can be processed by an eye tracking system according to an embodiment of the present disclosure.

Turning to FIG. 4, an example of a reference image 405 and an example of a subsequent current image 409 are shown. The images in this example are near infrared (NIR) images captured by a NIR image sensor.

In the reference image 405, the entire pupil 440 is visible as a dark region of the image and part of the iris 441 is visible around the pupil 440. The remaining parts of the image, which it will be appreciated will relate to the sclera and the user's face, are lighter than the pupil 440 and the iris 441.

In the current image 409, the user's upper eyelid has moved downwards, thereby obscuring an upper region of the pupil 440' and an upper region of the iris 441'. Therefore, a smaller portion of the pupil 440' and the iris 441' are visible in the current image 409 than are visible in the reference image 405.

FIG. 4 also shows a differential image 407, which represents the difference between the reference image 405 and the current image 409. It can be seen from the differential image 407 in FIG. 4 that those regions of the reference image 405 and the current image 409 that have not changed are shown as dark pixels; that is, these pixels have low differential intensity values. Also, those regions of the reference image 405 that are darker than the corresponding regions in the current image 409 (i.e. the strips of iris 441' and pupil 440' that have been obscured by the eyelid) are shown as bright pixels; that is, these pixels have a high differential intensity value in the differential image 407. Since the user's eye is horizontally aligned in the images of FIG. 4, the downward movement of the user's eyelid (as is the case between the reference image 405 and the current image 409) results in high intensity differential intensity values that are grouped in rows of the differential image 407. It is this row wise arrangement of differential intensity values in the differential image 407, which is caused by movement of the eyelid, that will subsequently be used to determine the eyelid data 313 in FIG. 3.

In this way, the difference between the current eye image and a reference eye image (e.g. the previous frame image) is used to determine the eyelid position during movements. As shown in FIG. 4, the eyelid is brighter than the pupil, iris and the eyelashes (for NIR images). When the eyelid moves vertically it causes a simultaneous intensity difference in all image columns where the eye is. The eyelid edge can be almost a straight horizontal line in the image, so when the eyelid is moving vertically the difference image will be almost black everywhere except for a few rows where all the pixels in the row are bright (as shown in the differential image 407 of FIG. 4).

Returning to FIG. 3, the eye tracking system 339 includes a row value calculator 308. The row value calculator 308 calculates a plurality of row values 311 by combining the differential intensity values in corresponding rows of the differential image 307. In this implementation, a separate row value 311 is calculated for each of the rows in the differential image 307 by combining the differential intensity values in all of the columns for each of the corresponding rows of the differential image 307. (Alternative implementations will be described below, including with reference to FIG. 5.) Also, in this implementation the differential intensity values are combined by a simple mathematical sum operation. Beneficially, the well-known row-sum function can be used to add the differential intensity values in each of the rows. However, it will be appreciated that many other mathematical operators can be used to combine the differential intensity values, such as: a multiplication of the differential intensity values; a weighted sum of the differential intensity values (for instance such that columns that are closer to the middle of the image are given a higher weighting in the expectation that they are more likely to include the user's pupil which provides a greater contrast to the eyelid and a correspondingly larger differential intensity value as the eyelid moves); or any other mathematical operator that can provide an indicator of the differential intensity values of a plurality of differential intensity values in a row of the differential image 307.

The eye tracking system 339 also includes an eyelid data detector 310 that determines the eyelid data 313 based on the plurality of row values 311.

In one example the eyelid data 313 comprises eyelid location data, which represents a location of an edge of an eyelid in the current image 309. In such an example, the eyelid data detector 310 can determine the eyelid location data as a row identifier associated with the row value 311 that has the highest value. With reference to FIG. 4, it can be seen that the row (or rows) in the differential image 407 with the highest intensity values correspond to the regions where the eyelid has moved to a position such that it obscures portions of the iris 441, 441' and pupil 440, 440' that were not obscured in the reference image 405. Therefore, these high intensity regions in the differential image represent the edge of the eyelid as it moves downwards from the reference image 405 to the current image 409.

Furthermore, in this example the eyelid data detector 310 only determines the row identifier associated with the row value 311 that has the highest value as eyelid location data if the highest row value 311 is greater than an eyelid detection threshold. That is, the edge of the eyelid is only detected if the combined intensity value for specific rows of the differential image 407 is sufficiently high to be classified as the edge of the eyelid. In this way the processing that is performed by the eyelid data detector 310 will not necessarily always output eyelid location data for every received current image 309. This is appropriate because the eyelid data detector 310 would not be able to determine the location of the eyelid if it had not moved between the reference image 305 and the current image 309.

In another example the eyelid data 313 comprises eyelid movement data, which can include blink data. Such blink data can be set as a blinking value or a non-blinking value as will be discussed in detail below with reference to FIGS. 6 and 7.

It will be appreciated that some steps in eye tracking, such as feature detection, can be computationally demanding. An advantage of examples disclosed herein is that, because the edge of the eyelid can be determined in a computationally efficient way, some of those steps (e.g. pupil detection or glint localization) can be run on only the parts of the image that are relevant to the steps (e.g. only performing pupil detection on parts of the image that are below the eyelid). In this way, better detectors can be provided and/or computation time can be saved. In contrast, positioning the eyelid using landmarks from a machine learning algorithm can be computationally expensive and might not be feasible in an embedded system.

Figure 5:
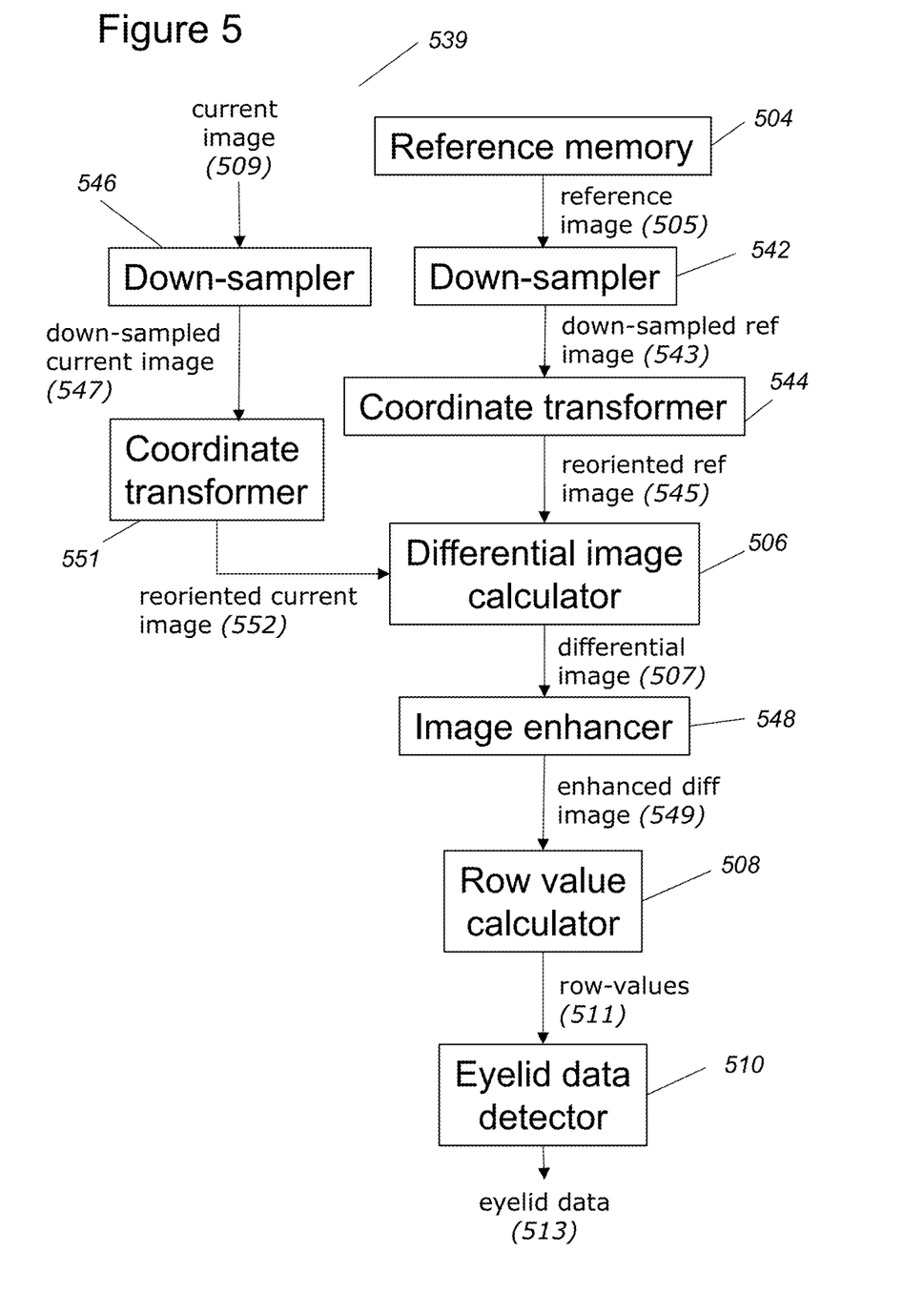
FIG. 5 shows another example of an eye tracking system according to an embodiment of the present disclosure.

FIG. 5 shows another example of an eye tracking system 539 according to an embodiment of the present disclosure. Features of FIG. 5 that are also shown in FIG. 3 will be given corresponding numbers in the 500 series. FIG. 5 will be used to describe various optional processing modules that are not illustrated in FIG. 3.

The eye tracking system 539 in this example again includes a reference memory 504, which may or may not be provided as part of the eye tracking system 539. The reference memory 504 provides a reference image 505 of an eye of a user to a down-sampler 542.

The reference image 505 may be an image that immediately precedes the current image 509 in a stream of images/frames. Alternatively, the reference image 505 may be an earlier image that does not immediately precede the current image 509. This can be useful in detecting slower moving eyelids because using a reference image 505 that is further back in time, and therefore the eyelid has had time to move by a sufficient amount that results in a significant difference between the current image 509 and the reference image 505.

In some examples, a plurality of reference images 505 may be provided, each of which is earlier in a stream of images than the current image 509. By comparing them each separately to the current image 509, i.e., by computing a plurality of differential images 507/enhanced differential images 549, more information about the eyelid movement will be provided. Therefore, the eyelid data detector 510 may be able to detect slower moving eyelids and/or detect eyelid movements with greater confidence and/or better accuracy.

The down-sampler 542 (which may be referred to as a reference down-sampler) down-samples the received reference image 505 to provide a down-sampled reference image 543. The down-sampled reference image 543 has a lower resolution, and hence fewer pixel locations, than the reference image 505. In one example the down-sampler 542 may perform minimum down-sampling, for instance to reduce the image of a 200×200 image down to a 25×25 image. Use of down-sampling can make all subsequent processing steps computationally cheaper without significantly reducing the quality/accuracy of the eyelid data 513. In fact, in some examples the down-sampling can actually improve the quality/accuracy of the eyelid data 513 because it can result in the edge of the eyelid in the subsequent differential image 507 being smoothed out. That is, using the down-sampling to generate a lower resolution image can remove high resolution information that is not needed for finding the eyelid.

The eye tracking system 539 in this example also includes a coordinate transformer 544 (which may be referred to as a reference coordinate transformer). The coordinate transformer 544 performs a coordinate transformation of the down-sampled reference image 543 (or directly on the received reference image 505 in some examples) to provide a reoriented reference image 545 such that the eyelid movements are vertical in the reoriented reference image 545.

Such a coordinate transformation can map each pixel location in an input image to a new pixel location in the transformed image, as follows:

If p is a pixel location, p=(x,y):
p_transformed=f(p_input), where f can be any function that takes a 2D point and returns a 2D point.

The coordinate transformer 544 can create a new transformed image where it writes the pixel values in the transformed image by reading the intensity at location p in the input image and writing that intensity value to location f(p) in the new image. I.e., for each location p in the input image: I_transformed[f(p)]=I_input[p]

For rotation around some point, p_ref (e.g. the center of the image):
p_transformed=R*(p_input−p_ref), where R is a 2D rotation matrix corresponding to the required angle of rotation.

The coordinate transformer 544 receives as an input a roll angle between the camera and eye. For example, if the roll angle is −10 degrees such that the eye has a −10 degree angle in the image, the coordinate transformer 544 calculates the rotated image by computing a rotation matrix corresponding to a +10 degree rotation around the image center and then applying the above calculation.

In this way, as indicated above, if the user's eye is not presented horizontally in the images, then the eye tracking system 539 can perform pre-processing on the images to rotate them such that the horizontal aspect of the user's eye is aligned with the horizontal aspect of the image. This can be useful if the camera that records the images is rolled or is viewing the eye from a perspective. Furthermore, having horizontal rows that generally align with the edge of the user's eyelid can simplify the downstream processing, for instance because known operators such as rowsum can be directly applied to the horizontal rows in the image.

It will be appreciated that the down-sampler 542 and the coordinate transformer 544 may be swapped around such that coordinate transformation is performed before down-sampling, while still providing the same overall functionality. Further still, either one or both of the down-sampler 542 and the coordinate transformer 544 may be omitted from the eye tracking system 539 in some examples.

It can be desirable to use the same down-sampling of the reference image 505 and the current image 509. For the coordinate transformation, they may be different if the eye and/or head have moved relative to the camera. Unwanted differential values that arise from head/eye movement can be eliminated by applying different coordinate transforms to each of the images such that both images are made similar and comparable. For example, such that the eye has the same roll angle in both images and the eye has the same size in both images.

In a further still example, a single down-sampler and a single coordinate transformer can be used to process current images 509 as they are received. In this way, the down-sampled and reoriented image can be provided: i) to the differential calculator 506 for processing; and also ii) to the reference memory for storing such that it can be used as a reference image for a subsequently received current image. In a yet further example, a coordinate transformer can perform a coordinate transformation on the differential image 507 instead of the current image 509 or the reference image 505.

FIG. 5 also shows a down-sampler 546 (which may be referred to as a current image down-sampler) and a coordinate transformer 551 (which may be referred to as a current image coordinate transformer) for processing the current image 509. The current image down-sampler 546 and the current image coordinate transformer 551 respectively provide a down-sampled current image 547 and a reoriented current image 552 in the same way as the corresponding components that process the reference image 505. Also, the current image down-sampler and the current image coordinate transformer 551 may be swapped around such that coordinate transformation is performed before down-sampling. Further still, either one or both of the current image down-sampler 546 and the coordinate transformer 551 may be omitted from the eye tracking system 539.

In this example, the differential image calculator 506 determines the difference between the reoriented reference image 545 and the reoriented current image 552 to define the differential image 507. In other examples, the differential image calculator 506 can determine the difference between the down-sampled reference image 543 and the down-sampled current image 547 to define the differential image. In fact, the differential image calculator 506 of FIG. 5 can be considered as indirectly determining the difference between the down-sampled reference image 543 and the down-sampled current image 547 to define the differential image 507.

In this example the differential image 507 represents a subtraction of the reoriented reference image 545 from the reoriented current image 552 (which indirectly represents a subtraction of the reference image 505 from the current image 509). Optionally, the differential image calculator 506 (or a downstream component) can split the differential image 507 into two difference images—a positive differential image that contains positive pixels (that is, differential intensity values that have a positive value but not differential intensity values that have a negative value) and a negative differential image that contains negative pixels (that is, differential intensity values that have a negative value but not differential intensity values that have a positive value).

Since the eyelid skin is brighter than the eye, the edge of an eyelid moving downwards will yield a row of positive pixels in the differential image 507. Conversely, the edge of an eyelid moving upwards will yield a row of negative pixels in the differential image 507. Therefore the positive differential image can be used to detect the eyelid when it is closing, and the negative differential image can be used to detect the eyelid when it is opening.

Of course, it will be appreciated that if the differential image calculator 506 subtracts the reoriented current image 552 from the reoriented reference image 545 (which indirectly represents a subtraction of the current image 509 from the reference image 505) then a negative differential image can be used to detect the eyelid when it is closing, and the positive differential image can be used to detect the eyelid when it is opening.

As will be discussed below with reference to FIGS. 6 and 7, if the eyelid data detector 510 is used for blink detection, the eye tracking system 539 may skip further processing of one of the positive differential image and the negative differential image (depending upon which one represents eyelid opening movements). For example, if no blink has been detected then the user has their eye open and the eye tracking system 539 operates such that it only detects a downward movement of the eyelid (which is represented by only one of the positive differential image and the negative differential image). Similarly, if it is detected that a blink is in progress then the user has their eye closed and the eye tracking system 539 operates such that it only detects an upward movement of the eyelid (which is represented by the other one of the positive differential image and the negative differential image).

In the example of FIG. 5, the eye tracking system 539 includes an image enhancer 548. The image enhancer 548 performs one or more image enhancement operations on the differential image 507 to provide an enhanced differential image 549. For example, the image enhancer 548 can enhance the differential image 507 by performing a known edge detection operation to enhance horizontal edges. The enhanced differential image 549 can also be referred to as a gradient image. An example of enhanced differential image 549 is shown in FIG. 4 with reference 449.

The row value calculator 508 in FIG. 5 processes the enhanced differential image 549 (which can be considered as indirectly processing the differential image 507) in order to provide a plurality of row values 511. As indicated above, this can include calculating a separate row value 511 for each of the individual rows in the differential image 507. In some applications, the row value calculator 508 can calculate separate row values 511 for one or a plurality of rows, and for one or more columns in those rows.

For instance:
  the row value calculator 508 can calculate the plurality of row values 511 by combining the differential intensity values in all of the columns of the corresponding rows of the differential image 507;
  the row value calculator 508 can calculate the plurality of row values 511 by combining the differential intensity values in a subset of the columns of the corresponding rows of the differential image, wherein a subset represents one or a plurality of the columns but not all of the columns;

the row value calculator 508 can calculate the plurality of row values 511 by combining the differential intensity values in corresponding individual rows of the differential image;

the row value calculator 508 can calculate the plurality of row values 511 by combining the differential intensity values in corresponding sets of adjacent rows of the differential image. The sets of adjacent rows may overlap with each other or may be contiguous.

The eyelid data detector 510 processes the row values 511 in order to provide the eyelid data 513. In one example, the eyelid data detector 510 can find which row, or group of adjacent rows, in the enhanced differential image 549 (and hence, which corresponding rows in the current image 509) has/have the highest intensity by computing row sums and searching for a maximum. Further still, as indicated above, if the maximum row value is above some threshold, then the eyelid data detector can update the eyelid data 513 (that indicates the eyelid position) to a row index/row identifier that is associated with the maximum row value.

In a further still example, the eyelid data detector 510 can determine eyelid location data that includes eyelid edge coordinates that define an edge of the eyelid in the current image 509. Such eyelid edge coordinates are not restricted to defining the edge of the eyelid as a straight line. This can be especially useful if the camera that records the images is underneath, and looking up at, the user's eye because the perspective will result in the edge of the eyelid being arc-shaped. For such an example, the eyelid data detector 510 can identify the row value 511 that has the highest value. Then, the eyelid data detector 510 can determine an eyelid detection region of the enhanced differential image 549 (or the differential image 507 if image enhancement is not performed) that includes:

i) an above-eyelid detection region of the enhanced differential image 549 as a predetermined number of rows that are above the row that has the highest row value;

ii) a below-eyelid detection region of the enhanced differential image 549 as a predetermined number of rows that are below the row that has the highest row value; and iii) the row that has the highest row value.

In this way, a region of the enhanced differential image 549 that is close to the row that has the highest row value is defined as a subset of the image in which the edge of the eyelid is expected to be. Then, for each of the plurality of columns in the eyelid detection region the eye data detector 510 determines an eyelid edge coordinate as a combination of: the row identifier for the pixel in the eyelid detection region that has the highest differential intensity value; and a column identifier for the associated column. The eye data detector 510 can then provide the eyelid location data as the plurality of eyelid edge coordinates, which represents the highest intensity differential intensity values in each column of the eyelid detection region.

This example can advantageously estimate the arc shape of the eyelid by finding the maximum row per column (or groups of adjacent columns). This search can be limited to a proximity around the row that has the highest row value 511.

A particular advantage of determining eyelid location data that defines the edge of the user's eyelid arises when the current image 509 (or an image derived from the current image 509) is also used for some other processing. For example, the location of the pupil in the current image 509 may be used for gaze detection. Beneficially, a pupil detection algorithm can use the eyelid location data to exclude regions of the current image that cannot include the pupil—for instance because they are above the edge of the user's upper eyelid in the current image. It will be appreciated that this is only one example of how the eyelid location data can be used in a different image processing algorithm to improve the performance of the other image processing algorithm; for instance to reduce processing time and increase processing efficiency.

Figure 6:
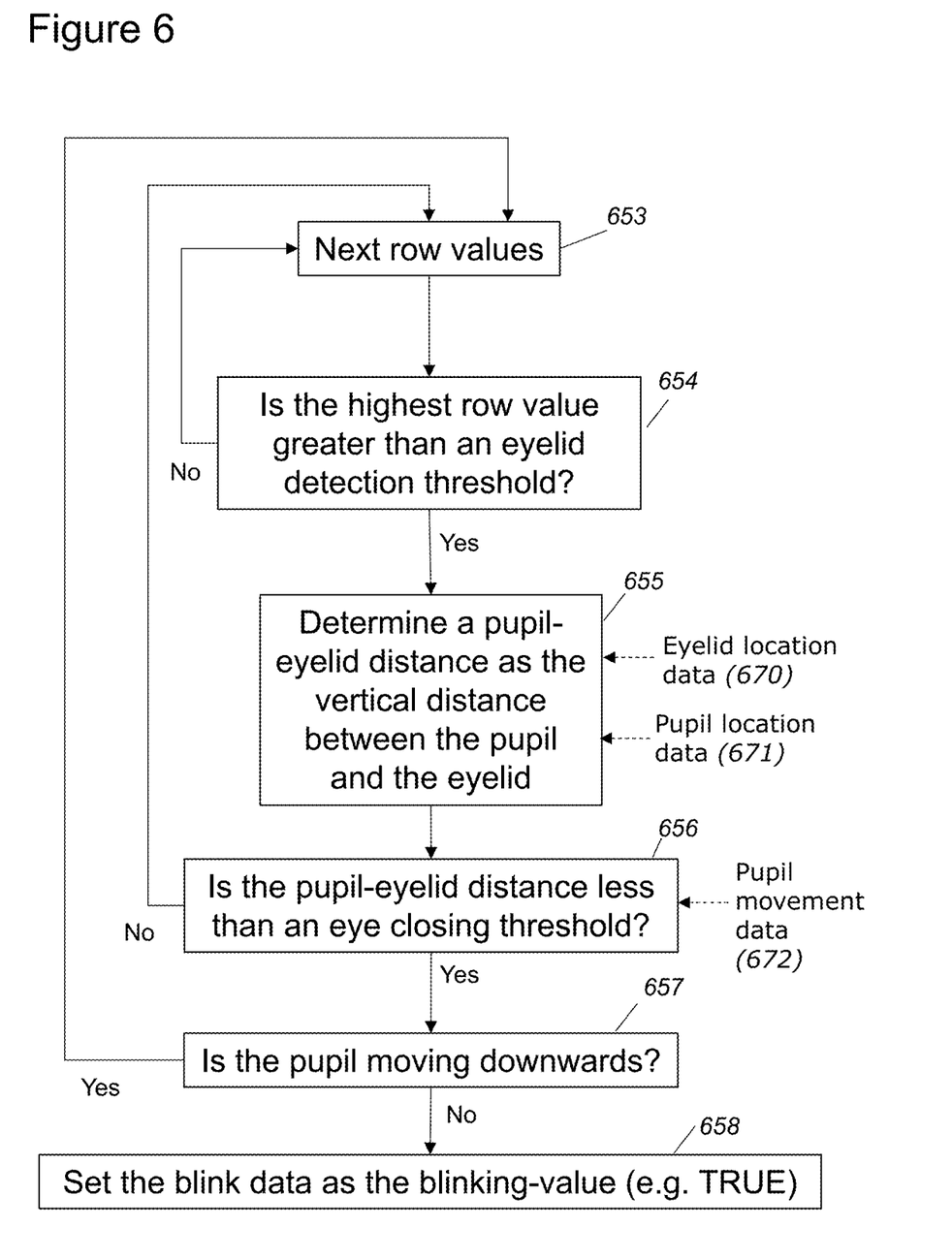
FIG. 6 illustrates schematically a process flow that can be performed by an eyelid data detector in order to detect a blink.

FIG. 6 illustrates schematically a process flow that can be performed by an eyelid data detector in order to detect a blink, when the blink data has non-blinking value. FIG. 7 illustrates schematically a process flow that can be performed by an eyelid data detector in order to detect the end of a blink, following the detection of a blink. In FIGS. 6 and 7 the processes set the value of blink data, which is an example of the eyelid data that is described with reference to FIGS. 3 and 5. As a consequence, an eyelid data detector that provides blink data can be considered as a blink detector. The blink data can have either a blinking value or a not-blinking value to provide an indication of whether or not the eye of the user is blinking in a current image.

Turning to FIG. 6, the process starts by receiving a next set of row values at step 653. With reference to FIG. 3 or FIG. 5, the eyelid data detector receives a new set of row values from the row value calculator for the next current image at step 653 in FIG. 6.

At step 654, the process compares the highest row value of the set of row values that is received at step 653 with an eyelid detection threshold. The value of the eyelid detection threshold can be predetermined for a specific resolution of the differential image from which it is calculated and/or to provide a required level of sensitivity in blink detection. If the highest row value is not greater than the eyelid detection threshold, then the process returns to step 653 to receive the next set of row values for the next current image on the basis that a blink has not been detected. If the highest row value is greater than the eyelid detection threshold, then the process moves on to step 655 in this example. In another example, if the highest row value is greater than the eyelid detection threshold, then the process moves directly to step 658 to set the blink data as the blinking value (e.g. TRUE). In some applications it can be beneficial to move straight from step 654 to step 658 if the information that is required to perform the intermediate processing steps that are shown in FIG. 6 is not available (for instance if eyelid location data 670 and pupil location data 671 are not available, as will be appreciated from the description that follows).

The eyelid amplitude (which is represented by the highest row value) can be seen as a confidence value of a horizontal edge moving in the expected direction (in this case downwards). Therefore, comparing the highest row value with the eyelid detection threshold can be performed so that a blink is only detected if the eyelid amplitude provides sufficient confidence that a blink is taking place.

In this example, the process also receives eyelid location data 670 that represents a location of an edge of an eyelid in the current image. Examples of how such eyelid location data 670 can be calculated are described above. Also, the process receives pupil location data 671 that is representative of the location of the pupil in the current image. Pupil detection algorithms that can provide the pupil location data 671 are well-known in the art.

At step 655, the process can then determine a pupil-eyelid distance as the vertical distance between the pupil location data 671 and the eyelid location data 670. This vertical distance can be expressed as the number of rows between the location of the edge of the eyelid and the location of the pupil in the current image. The location of the pupil in the current image can be the location of the upper edge of the pupil or the location of center of the pupil.

At step 656, the process then compares the determined pupil-eyelid distance with an eye closing threshold. If the pupil-eyelid distance is not less than the eye closing threshold, then the process returns to step 653 to receive the next set of row values for the next current image on the basis that a blink has not been detected. If the pupil-eyelid distance is less than the eye closing threshold, then the process moves on to step 657 in this example. In another example, if the pupil-eyelid distance is less than the eye closing threshold, then the process moves directly to step 658 to set the blink data as the blinking value (e.g. TRUE). In some applications it can be beneficial to move straight from step 656 to step 658 if the information that is required to perform the intermediate processing step that is shown in FIG. 6 is not available (for instance if pupil movement data 672 is not available, as will be appreciated from the description that follows). In which case, process can set the blink data as the blinking value if: the highest row value is greater than an eyelid detection threshold (as determined at step 654); and the pupil-eyelid distance is less than an eye closing threshold (as determined at step 656).

In this example, the process also receives pupil movement data 672 that represents movement of the pupil between images in a sequence of images up to the current image. That is, the pupil movement data 672 can represent the direction of any movement of the pupil in a predetermined number of images before the current image. It will be appreciated that the pupil movement data 672 can be determined by calculating the rate of change of the pupil location data 671 over a series of images (which could be a series of only 2 images). For instance a blink detector algorithm can be provided with the current pupil every frame, and then keep a recent history of pupil locations in a buffer, e.g. the most recent 5 frames. The displacement of the pupil can then be computed easily, for example by subtracting the pupil location of a past frame from the pupil location of the current frame. If the displacement (in y-direction) is smaller than some threshold, then the pupil can be considered stationary.

At step 657, the pupil movement data is then processed to determine whether or not it represents downward movement. If the pupil movement data does represent downward movement then the process returns to step 653 to receive the next set of row values for the next current image on the basis that a blink has not been detected (it could instead be a downward saccade, for example). If the pupil movement data does not represent downward movement, then the process moves on to step 658 to set the blink data as the blinking value. In this way, the process sets the blink data as the blinking value if: the highest row value is greater than an eyelid detection threshold (as determined at step 654); the pupil-eyelid distance is less than eye closing threshold (as determined at step 656 if the requisite information is available—if it is not available, then this criteria can be omitted); and the pupil movement data does not represent downward movement (as determined at step 657).

As discussed above, if there is not sufficient information to determine: i) if the pupil-eyelid distance is less than the eye closing threshold (at step 656); and/or ii) if the pupil movement data represents downward movement (at step 657), then the process bases the decision solely on whether or not the highest row value is greater than the eyelid detection threshold (at step 654). A benefit of the processing that is performed at steps 656 and 657 is that, for some subjects, it can help distinguish eyelid movements caused by blinks from eyelid movements caused by downward saccades.

Figure 7:
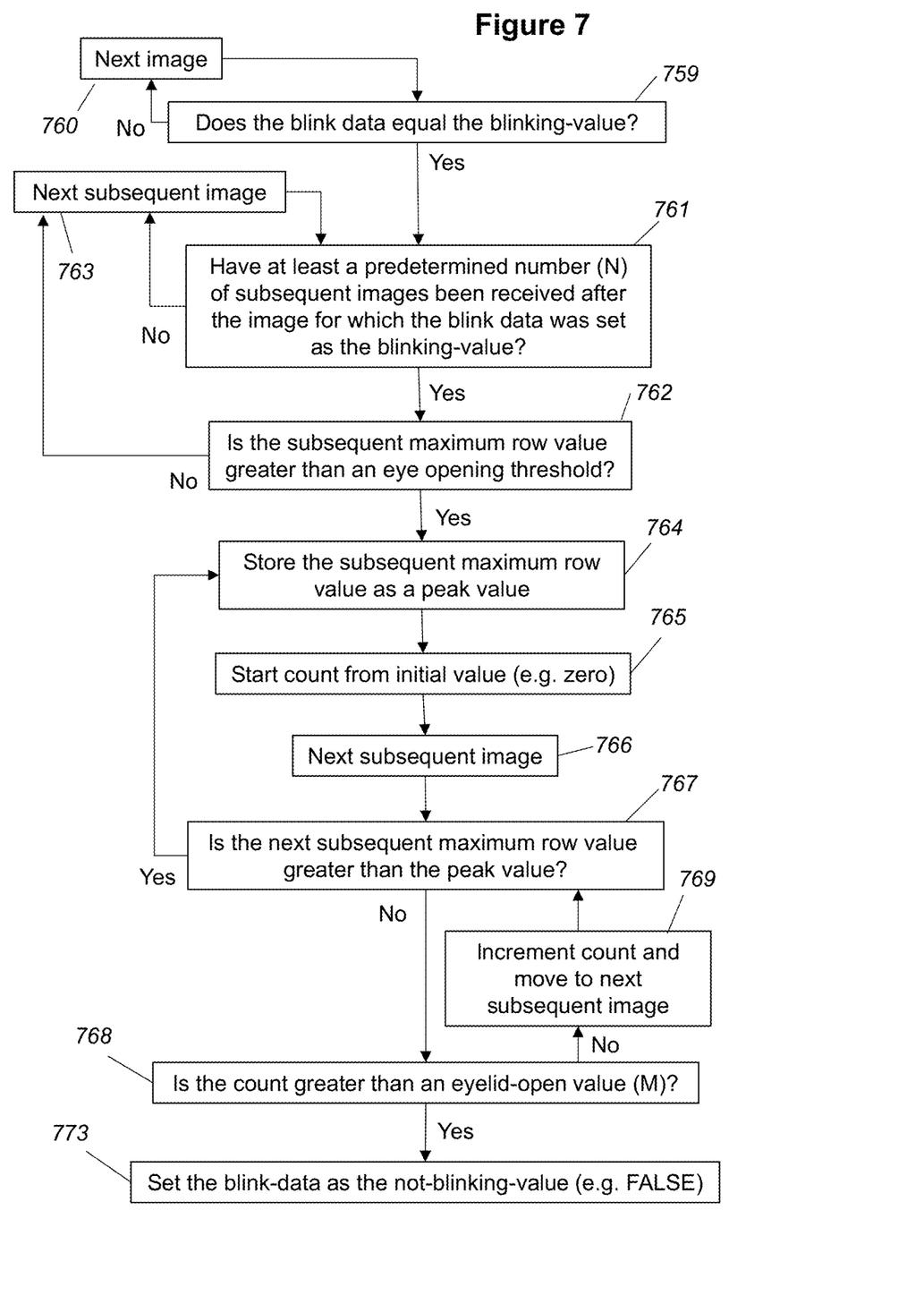
FIG. 7 illustrates schematically a process flow that can be performed by an eyelid data detector in order to detect the end of a blink.

FIG. 7 illustrates a process for detecting the end of a blink. In some examples the process for detecting the end of a blink may only be implemented following the earlier detection of a blink, for instance in response to the process of FIG. 6 setting the blink data as a blinking value. The process of FIG. 7 illustrates an optional first processing step 759 of checking whether or not the blink data equals the blinking value—if it does not, then the process moves on the next current image at step 760 and repeats the check at step 759 for the next current image.

If the process determines at step 759 that the blink data does equal the blinking value, then the process moves on to step 761 and beyond where subsequent images (after the current image for which the blink data was set as the blinking value) are sequentially received and processed. For one or more of the subsequent images, although not shown in FIG. 7 but as described above with reference to FIGS. 3 and 5, the process determines a difference between a subsequent reference image and the subsequent image to define a subsequent differential image. In the same way as described above, the subsequent differential image has a two dimensional pixel array of pixel locations that are arranged in a plurality of rows and columns, each pixel location having a subsequent differential intensity value. This processing is described in detail with reference to the differential image calculator of FIGS. 3 and 5. The names of some of the images and parameters have been relabeled with reference to FIG. 7 with a "subsequent-" prefix in that they are subsequent to the determination of a blink. The names of the images and parameters in FIG. 7 have been labelled this way to distinguish them from the images and parameters that are described with reference to FIGS. 3 and 5.

At step 761, the process determines whether or not at least a predetermined number (N) of subsequent images have been received after the current image for which the blink data was set as the blinking value. If the predetermined number (N) of subsequent images have not been received, then the process moves to step 763 to receive the next subsequent image and then move on to step 761 again to determine whether or not the new predetermined number (N) of subsequent images have now been received, now that one more subsequent image has been received. The comparison with the predetermined number (N) of subsequent images is performed on the basis that a blink should have at least a minimum duration. If that minimum duration (as defined by the predetermined number (N)) has not elapsed, then the process should not trigger the end of the blink. The value for the predetermined number (N) can be set based on the refresh rate of the images and/or to suit any particular application. In one example, the predetermined number (N) may be 10.

At step 762, the process can calculate or receive a plurality of row values by combining the subsequent differential intensity values in corresponding rows of the subsequent differential image in the same way described above. The process can then determine a subsequent maximum row value as the highest value of the plurality of row values, and compare the subsequent maximum row value for the most recently received subsequent image with an eye opening threshold. If the subsequent maximum row value for the most recently received subsequent image is not greater than the eye opening threshold, then the process returns to step 763 to receive the next subsequent image. If the subsequent maximum row value for the most recently received subsequent image is greater than the eye opening threshold, then the process moves on to step 764.

It will be appreciated that the processing of steps 761 and 762 can be performed in reverse order or in parallel with each other, and only when the result of both comparisons as they are phrased in FIG. 7 is a 'yes' does the process move on to step 764.

At step 764, in response to the subsequent maximum row value for the most recently received subsequent current image being greater than the eye opening threshold, the process stores the subsequent maximum row value for the most recently received subsequent current image as a peak value. At step 765, the process starts a count of subsequently received frames from an initial value. It is intuitive for the initial value of the count to be zero, but it is not essential for the functionality of the process. The count can be a count of the number of further subsequent images that are received or can be a time counter—both counts are equivalent for a fixed refresh rate of the images. Then at step 766, the process moves on to the next subsequent image.

At step 767, the process compares the subsequent maximum row value with the peak value. If the subsequent maximum row value is greater than the peak value, then the process returns to step 764 to store the new (higher) subsequent maximum row value as the new peak value and restart the count at step 765. If the subsequent maximum row value is not greater than the peak value, then the process moves on step 768.

At step 768, the process compares the count with an eyelid-open value (M). If the count is not higher than the eyelid-open value (M) then the process moves to step 769 in order to increment the count and move to the next subsequent image, and the process then returns to step 767 to compare the subsequent maximum row value for the new subsequent image with the peak value. If, at step 768, the count is higher than the eyelid-open value (M) then the process moves to step 773 to set the blink data as the non-blinking value (e.g. FALSE).

The processing of these last steps of FIG. 7 can be summarized as: if the count reaches an eyelid-open value without the subsequent maximum row value of a later subsequent image exceeding the peak value, then the process sets the blink data as the not-blinking value (e.g. FALSE). That is, there have to be M consecutive frames with no eyelid amplitude larger than the peak amplitude before the end of the blink is detected. If an amplitude larger than the current peak amplitude is recorded, then the peak value is updated and the counter of consecutive frames towards M is reset.

In this way, a blink detector can be provided that utilizes the eyelid vertical position by estimating whether the eye is currently blinking or not. In the algorithm that is described with reference to FIG. 6, the eyelid vertical position and movement can be used as well as a detection of the pupil in the image. As is known in the art, pupil detection can be a circle fitted to the edge between pupil and iris.

This blink detection can function as a state machine with two states:

1. The user is not blinking; the user's eye is open and the process of FIG. 6 is performed to check if the user is about to close the eye; and 2. The user is blinking; the user's eye is closed and the process of FIG. 7 is performed to check if the user is about to open the eye.

As discussed above, the processing in state 1 can be performed on only one of a positive differential image and a negative differential image (depending upon which of the current image and the reference image is subtracted from the other) such that only downward movements of the eyelid are represented. Similarly, the processing in state 2 can be performed on only the other of the positive differential image and the negative differential image (depending upon which of the current image and the reference image is subtracted from the other) such that only upward movements of the eyelid are represented.

The blink detection algorithm can be run for each eye separately in order to provide: left-blink data that represents whether or not the left eye of a user is blinking; and right-blink data that represents whether or not the right eye of the user is blinking. If the left-blink data indicates a blink, then the thresholds that are applied for blink detection for the right eye may be relaxed, thus reducing the probability of a false negative detection (failing to detect a blink) for the right eye. Similarly, if the right-blink data indicates a blink, then the thresholds that are applied for blink detection for the left eye may be relaxed. This can improve detection performance in situations where the user blinks with both eyes. In this way, the algorithm instances for the left and right eye can depend on each other since they can each receive feedback of the blink state (true/false) of the other eye side. This processing can potentially lead to false positive detection if the user is blinking with only one eye, but that is not a common use case.

Figure 8:
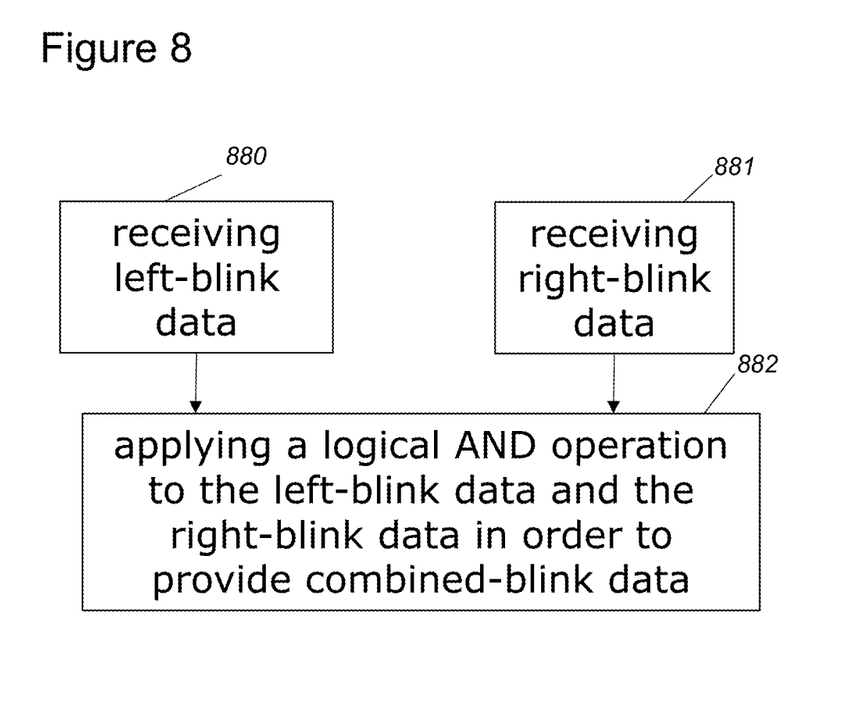
FIG. 8 illustrates schematically a process flow that can be performed by a blink detector.

FIG. 8 illustrates schematically a process flow that can be performed by a blink detector.

An eye tracking system can be provided that includes a blink detector that receives left-blink data and right-blink data at steps 880 and 881. The left-blink data represents whether or not the left eye of a user is blinking. The right-blink data represents whether or not the right eye of the user is blinking. The left-blink data and the right-blink data can be set by the processing that is described above with reference to FIGS. 6 and 7, performed respectively on images of the user's left and right eye. Alternatively, the left-blink data and the right-blink data can be provided by any other algorithm that is known in the art. At step 882, the blink detector can then apply a logical AND operation to the left-blink data and the right-blink data in order to provide combined-blink data. In this way, the combined-blink data only represents a blink when both the left-blink data and the right-blink data indicate that both eyes of the user are blinking. This can provide greater certainty that a blink is correctly identified.

Generally, examples described herein can advantageously find the (vertical) position of the eyelid in a computationally cheap way, which can lead on to enabling better blink detection, eye openness estimation and can allow for limiting the area where e.g. pupil detection is run.

What is claimed is:

1. An eye tracking system comprising a controller, the controller configured to: receive a reference image of an eye;
   receive a current image of the eye;
   determine a difference between the reference image and the current image to define a differential image, wherein the differential image comprises a two dimensional pixel array of pixel locations that are arranged in a plurality of rows and columns, each pixel location having a differential intensity value;

calculate a plurality of row values by combining the differential intensity values in corresponding rows of the differential image and further to calculate a plurality of row values by summing the differential intensity values in the corresponding rows of the differential image; and determine eyelid data based on the plurality of row values.

2. The eye tracking system of claim 1, wherein the reference image and the current image comprise corresponding pixel arrays of pixel locations, each pixel location having an intensity value; and wherein the controller is configured to determine the difference between the reference image and the current image by matrix subtraction of the corresponding pixel arrays to define the differential image as the pixel array of differential intensity values.

3. The eye tracking system of claim 1, wherein the controller is further configured to:

down-sample the received reference image and the received current image to provide a down sampled reference image and a down sampled current image, respectively; and determine the difference between the down sampled reference image and the down sampled current image to define the differential image.

4. The eye tracking system of claim 1, wherein the controller is further configured to:

perform a coordinate transformation of the received reference image and the received current image to provide a reoriented reference image and a reoriented current image, respectively, such that eyelid movements are vertical in the reoriented images; and determine the difference between the reoriented reference image and the reoriented current image to define the differential image.

5. The eye tracking system of claim 1, wherein the controller is further configured to:

perform one or more image enhancement operations on the differential image to provide an enhanced differential image; and calculate the plurality of row values by combining the differential intensity values in corresponding rows of the enhanced differential image.

6. The eye tracking system of claim 1, wherein the eyelid data comprises eyelid location data that represents a location of an edge of an eyelid in the current image; and wherein the controller is further configured to determine the eyelid location data as a row identifier associated with the row value that has a highest value, if that highest value is greater than an eyelid detection threshold.

7. The eye tracking system of claim 1, wherein the eyelid data comprises eyelid location data that represents a location of an edge of an eyelid in the current image, and wherein the controller is further configured to:

identify the row value that has a highest value;
determine an eyelid detection region of the differential image that comprises:
an above-eyelid detection region of the differential image as a predetermined number of rows that are above the row that has the highest row value,
a below-eyelid detection region of the differential image as a predetermined number of rows that are below the row that has the highest row value, and
the row that has the highest row value;
for each of the plurality of columns in the eyelid detection region, determine an eyelid edge coordinate as a combination of the row identifier for the pixel in the eyelid detection region that has the highest differential intensity value and a column identifier for the associated column; and provide the eyelid location data as the plurality of eyelid edge coordinates.

8. The eye tracking system of claim 1, wherein the eyelid data comprises blink data that has either a blinking value or a not-blinking value to provide an indication of whether or not the eye is blinking in the current image; and wherein the controller further comprises a blink detector that is configured to set the blink data as the blinking value if the highest row value is greater than an eyelid detection threshold.

9. The eye tracking system of claim 8, wherein the eyelid data further comprises eyelid location that represents a location of an edge of an eyelid in the current image, and wherein the blink detector is further configured to:

receive pupil location data representative of the location of the pupil in the current image determine a pupil-eyelid distance as the vertical distance between the pupil location data
and the eyelid location data; and
set the blink data as the blinking value if the highest row value is greater than an eyelid detection threshold and the pupil-eyelid distance is less than an eye closing threshold.

10. The eye tracking system of claim 9, wherein the blink detector is further configured to:

receive pupil movement data representative of movement of the pupil between images up to the current image; and set the blink data as the blinking value if the highest row value is greater than an eyelid detection threshold and the pupil movement data does not represent downward movement.

11. The eye tracking system of claim 8, wherein, if the blink data comprises the blinking value, the blink detector is further configured to sequentially receive subsequent images and for one or more of the subsequent images:

determine a difference between a subsequent reference image and the subsequent image to define a subsequent differential image, wherein the subsequent differential image has a two dimensional pixel array of pixel locations that are arranged in a plurality of rows and columns, each pixel location having a subsequent differential intensity value;

set the blink data as the non-blinking value when at least a predetermined number of subsequent images have been received after the current image for which the blink data was set as the blinking value;

calculate a plurality of row values by combining the subsequent differential intensity values in corresponding rows of the subsequent differential image;

determine a subsequent maximum row value as the highest value of the plurality of row values;

compare the subsequent maximum row value for the most recently received subsequent image with an eye opening threshold; and in response to the subsequent maximum row value for the most recently received subsequent current image being greater than the eye opening threshold:

store the subsequent maximum row value for the most recently received subsequent current image as a peak value, start a count of subsequently received frames from an initial value, if the subsequent maximum row value of a later subsequent image is greater than the peak value, then store the subsequent maximum row value as the peak value, and if the count reaches an eyelid open value without the subsequent maximum row value of a later subsequent image exceeding the peak value, then set the blink data as the not-blinking value.

12. The eye tracking system of claim 1, wherein the controller is configured to calculate the plurality of row values by:

combining the differential intensity values in all of the columns of the corresponding rows of the differential image;

calculating the plurality of row values by combining the differential intensity values in a subset of the columns of the corresponding rows of the differential image;

calculating the plurality of row values by combining the differential intensity values in corresponding individual rows of the differential image; or calculating the plurality of row values by combining the differential intensity values in corresponding sets of adjacent rows of the differential image.

13. The eye tracking system of claim 1, wherein the eye tracking system is a component of a head mounted device.

14. The eye tracking system of claim 1, wherein the eye comprises an eye of a user.

15. A method of providing eyelid data, the method comprising: receiving a reference image of an eye;

receiving a current image of the eye;

determining a difference between the reference image and the current image to define a differential image, wherein the differential image comprises a two dimensional pixel array of pixel locations that are arranged in a plurality of rows and columns, each pixel location having a differential intensity value;

calculating a plurality of row values by combining the differential intensity values in corresponding rows of the differential image and further, calculating a plurality of row values by summing the differential intensity values in the corresponding rows of the differential image; and determining eyelid data based on the plurality of row values.

16. The method of claim 15, wherein the reference image and the current image comprise corresponding pixel arrays of pixel locations, each pixel location having an intensity value; and further comprising determining the difference between the reference image and the current image by matrix subtraction of the corresponding pixel arrays to define the differential image as the pixel array of differential intensity values.

17. The method of claim 15, further comprising:

performing a coordinate transformation of the received reference image and the received current image to provide a reoriented reference image and a reoriented current image, respectively, such that eyelid movements are vertical in the reoriented images; and determining the difference between the reoriented reference image and the reoriented current image to define the differential image.

18. The method of claim 15, further comprising:

performing one or more image enhancement operations on the differential image to provide an enhanced differential image; and calculating the plurality of row values by combining the differential intensity values in corresponding rows of the enhanced differential image.

19. A non-transitory computer-readable storage medium storing computer-executable instructions that, when executed by a processor, causes the processor to:

receive a reference image of an eye; receive a current image of the eye;

determine a difference between the reference image and the current image to define a differential image, wherein the differential image comprises a two dimensional pixel array of pixel locations that are arranged in a plurality of rows and columns, each pixel location having a differential intensity value;

calculate a plurality of row values by combining the differential intensity values in corresponding rows of the differential image and further to calculate a plurality of row values by summing the differential intensity values in the corresponding rows of the differential image; and determine eyelid data based on the plurality of row values.

* * * * *